(12) United States Patent
Mathiesen

(10) Patent No.: US 6,911,188 B2
(45) Date of Patent: Jun. 28, 2005

(54) PRODUCTION OF TWO ALKALI METAL SALTS BY A COMBINED ION EXCHANGE AND CRYSTALLIZATION PROCESS

(75) Inventor: Flemming Mathiesen, Fredericia (DK)

(73) Assignee: Kemira Growhow Oy, Helsinki (FI)

( * ) Notice: Subject to any disclaimer, the term of this patent is extended or adjusted under 35 U.S.C. 154(b) by 285 days.

(21) Appl. No.: 10/148,569

(22) PCT Filed: Dec. 1, 2000

(86) PCT No.: PCT/FI00/01056

§ 371 (c)(1),
(2), (4) Date: Aug. 13, 2002

(87) PCT Pub. No.: WO01/40112

PCT Pub. Date: Jun. 7, 2001

(65) Prior Publication Data

US 2003/0133862 A1 Jul. 17, 2003

(30) Foreign Application Priority Data

Dec. 3, 1999 (FI) ............................................. 19992606

(51) Int. Cl.[7] .............................. C01B 25/30; C01G 1/08
(52) U.S. Cl. ........................ 423/181; 423/308; 423/309; 423/311; 423/395; 423/397
(58) Field of Search ................................ 423/307, 308, 423/309, 311, 395, 397, 181

(56) References Cited

U.S. PATENT DOCUMENTS

| | | | |
|---|---|---|---|
| 3,497,329 A | * 2/1970 | Amanrich et al. | 423/319 |
| 3,645,673 A | * 2/1972 | Labriola et al. | 423/395 |
| 3,690,819 A | * 9/1972 | Veronica | 423/397 |
| 3,840,640 A | * 10/1974 | Drechsel | 423/157.4 |
| 3,993,466 A | 11/1976 | Knudsen | |
| 4,008,307 A | 2/1977 | Loest et al. | |
| 4,678,649 A | 7/1987 | Isoef et al. | |
| 4,704,263 A | * 11/1987 | Berry et al. | 423/312 |
| 4,836,995 A | 6/1989 | Manor et al. | |
| 4,885,148 A | 12/1989 | Erickson et al. | |
| 5,098,461 A | * 3/1992 | Sullivan et al. | 71/39 |
| 5,110,578 A | * 5/1992 | Abidaud | 423/202 |
| 5,114,460 A | 5/1992 | Nguyen et al. | |
| 6,274,105 B1 | 8/2001 | Vorage et al. | |

FOREIGN PATENT DOCUMENTS

| | | |
|---|---|---|
| GB | 1297524 A | 11/1972 |
| HU | 9903884 | 3/2000 |
| WO | WO9747559 | 12/1997 |

* cited by examiner

Primary Examiner—Wayne A. Langel
(74) Attorney, Agent, or Firm—Birch, Stewart, Kolasch & Birch, LLP

(57) ABSTRACT

The invention relates a process for producing an alkali metal nitrate and an alkali metal phosphate in the same process from a phosphate raw material and a nitrate raw material comprising the steps of:

a) reacting the phosphate raw material with the nitrate raw material to provide an aqueous nitrophosphate feed, optionally followed by the separation of solid material, b) introducing the aqueous nitrophosphate feed into a first ion exchange step comprising an alkali metal-loaded cationic exchange resin for exchanging cations present in the feed with alkali metal ions present on the resin to obtain a stream enriched in alkali metal ions, c) subjecting the stream from step (b) to a first crystallization under such conditions that an alkali metal nitrate is crystallized and separating the crystallized alkali metal nitrate from the mother liquor, d) introducing the mother liquor from step (c) into a second ion exchange step comprising an alkali metal-loaded cationic exchange resin for exchanging cations present in the mother liquor with alkali metal ions present on the resin to obtain a phosphate containing stream enriched in alkali metal ions, and e) subjecting the stream from step (d) to a second crystallization under such conditions that an alkali metal phoshate is crystallized and separating the crystallized alkali metal phosphate from the mother liquor.

15 Claims, 1 Drawing Sheet

PRODUCTION OF TWO ALKALI METAL SALTS BY A COMBINED ION EXCHANGE AND CRYSTALLIZATION PROCESS

FIELD OF THE INVENTION

The present invention relates to a process for producing an alkali metal nitrate and phosphate such as potassium nitrate and phosphate in the same process comprising ion exchange and crystallisation steps. The produced salts are especially useful as fertilisers in horticulture where fertilisers are frequently applied through irrigation. The inventive process comprises the following unit operations: digestion, ion exchange, neutralisation, separation of solids, concentration and crystallisation.

BACKGROUND OF INVENTION

High-purity, fully water-soluble alkali metal nitrates or phosphates are particularly useful in horticulture and have wide application in various industries such as in the manufacture of pharmaceuticals, food or feed. While various methods have been proposed in past for their production only few have been commercialised.

Potassium nitrate, the third most widely used potassium salt in agriculture is traditionally produced from an ore containing sodium nitrate, potassium nitrate, some chlorides, and sulphates. The application of this technology is, however, limited by the availability of the nitrate ore.

Potassium nitrate can also be produced synthetically in a low temperature reaction of potassium chloride with nitric acid followed by extraction of the coproduct hydrochloric acid with an organic solvent. Bringing a volatile organic substance in contact with nitrate may be hazardous, and recovering the solvent will have an impact on the performance and economy of the process. Hydrochloric acid, especially together with nitric acid, is highly corrosive and introduces serious limitations to the equipment construction materials. Furthermore, in the absence of a local need hydrochloric acid must be considered as a waste.

Ion exchange technology has also been proposed for potassium nitrate production. In this process the hydronium ions from nitric acid are exchanged with potassium ions from potassium chloride, giving a potassium nitrate solution and a hydrochloric acid solution, see U.S. Pat. No. 5,110,578. A drawback with this "direct" ion exchange process is the risk for mixing potassium chloride and nitric acid whereby a very corrosive fluid will be formed (aqua regia).

At present, most of the potassium phosphate salts used in industry and agriculture are produced from pure raw materials, potassium hydroxide or carbonate and purified phosphoric acid. Potassium phosphates are excellent fertilisers and much research is done in an effort to find an economical production process based on cheap raw materials and obtain an acceptable product quality.

The production of monopotassium phosphate from lower grade raw materials, potassium chloride and wet process phosphoric acid, has been investigated intensively during the last years, U.S. Pat. Nos. 4,836,995; 4,885,148; and 5,114,460. In all processes described in these three patents the real challenge is the separation of chlorine from potassium. In these processes this is done either by evaporation or by solvent extraction of the by-product hydrochloric acid. Direct evaporation of hydrochloric acid is problematic due to the formation of insoluble potassium phosphate compounds, which will reduce the overall yield. In the organic solvent extraction process the recovery of the solvent is essential for the overall economy and also for avoiding organic material in the waste stream.

In U.S. Pat. No. 4,678,649 a process is described for the manufacture of pure monopotassium phosphate without utilising solvents to remove the hydrochloric acid. According to the process, monopotassium sulphate is reacted with a phosphate constituent selected from phosphate rock, dicalcium phosphate or mixtures thereof in the presence of phosphoric acid. The outputs of the process are gypsum, calcium phosphate, hydrochloric acid, and monopotassium phosphate. Mixing sulphuric acid with potassium chloride produces monopotassium sulphate at an elevated temperature whereby hydrochloric acid will evaporate, which will limit the selection of construction materials. Hydrochloric acid and the significant amounts of gypsum generated in the process may be regarded as waste.

Ion exchange technology has also been considered in the production of fertilisers and especially in connection with the production of chlorine-free potassium salts, see U.S. Pat. Nos. 3,993,466, 4,008,307, and 4,704,263.

In the potassium phosphate production process described in U.S. Pat. No. 4,008,307 the raw materials are phosphoric acid and potassium sulphate. The ion exchange process can be either cationic or anionic. In both cases the output will be a potassium phosphate solution and a sulphuric acid solution. An organic solvent is needed to extract potassium phosphate from a sulphate containing solution.

In U.S. Pat. No. 4,704,263, which is dealing with a cationic process for producing potassium phosphate, the ion exchange feed streams are a metal phosphate salt solution and a potassium chloride solution. The metal phosphate salt may be calcium phosphate, magnesium phosphate or iron phosphate, and more particularly, a monocalcium phosphate. A drawback of using monocalcium phosphate is the need of phosphoric acid and the low concentration of calcium ions in the solution, necessitating a calcium enrichment step in the continuous ion exchange carousel system (ISEP).

BRIEF DESCRIPTION OR THE INVENTION

It is an object of the present invention to provide a continuous combined process for producing both a high-purity, water-soluble alkali metal nitrate and a high-purity, water-soluble alkali metal phosphate in the same process starting from inexpensive raw materials. It is an other object of the present invention to provide a process which besides the desired products only produces products which are harmless wastes or which can be upgraded to useful products.

Thus, the present invention provides a process for producing an alkali metal nitrate and an alkali metal phosphate in the same process from a phosphate raw material and a nitrate raw material comprising the steps of:

a) reacting the phosphate raw material with the nitrate raw material to provide an aqueous nitrophosphate feed, optionally followed by the separation of solid material, b) introducing the aqueous nitrophosphate feed into a first ion exchange step comprising an alkali metal-loaded cationic exchange resin for exchanging cations present in the feed with alkali metal ions present on the resin to obtain a stream enriched in alkali metal ions, c) subjecting the stream from step (b) to a first crystallisation under such conditions that an alkali metal nitrate is crystallised and separating the crystallised alkali metal nitrate from the mother liquor, d) introducing the mother liquor from step (c) into a second ion exchange step comprising an alkali metal-loaded cationic exchange resin for exchanging cations present in the mother liquor with alkali metal ions present on the resin to obtain a phosphate containing stream enriched in alkali metal ions, and e) subjecting the stream from step (d) to a second crystallisation under such conditions that an alkali metal phoshate is crystallised and separating the crystallised alkali metal phosphate from the mother liquor.

In a preferred embodiment of the invention the process comprises further the step of:

f) introducing the mother liquor from step (e) into the first crystallisation step (c).

Accordingly the process of the present invention is a combined ion exchange and crystallisation process comprising two ion exchange steps and two crystallisation steps. Preferably the process is a continuous process.

Preferably, the cationic exchange resins of both the first ion exchange step and the second ion exchange step are part of the same ion exchange system, which comprises a multiple column system operating as a continuous simulated moving bed, wherein the column are filled with said cationic exchange resins.

The alkali metal is potassium or sodium, preferably potassium. Thus, the two produced products are preferably potassium nitrate and a potassium phosphate such as monopotassium phosphate.

The ion exchange resins can be regenerated with a solution of an alkali metal salt such as potassium chloride.

Said cations to be exchanged and present in the feeds introduced into the first and second ion exchange steps comprise at least calcium, hydronium and optionally, depending on the phosphate raw material, minor amounts of magnesium ions.

The phosphate raw material comprises preferably phosphate rock but also other suitable phosphate raw materials e.g. mono- or dicalcium phosphate or phosphoric acid or mixtures thereof can be used.

The nitrate raw material comprises preferably nitric acid but also other suitable nitrate raw materials e.g. calcium nitrate or a mixture of nitric acid and calcium nitrate can be used.

The most preferred raw material are rock phosphate and nitric acid.

The first crystallisation is preferably effected by concentration at a temperature between −30° C. and 80° C., preferably between −10° C. and 10° C.

According to the process of the present invention it is possible to increase the pH of the stream from the second ion exchange step (d) to a value between 3 and 6 in order to precipitate impurities such as calcium and magnesium phosphates which can be recycled to step (a) as part of the phosphate raw material. To increase the pH to the desired value a base, preferably potassium hydroxide, is used.

The second crystallisation is preferably effected by adjusting the pH to a value between 4 and 5 and by concentration at a temperature between 0° C. and 100° C., preferably between 30° C. and 80° C. To increase the pH to the desired value a base, preferably potassium hydroxide, is used.

If the phosphate raw material contains fluorides it is possible to remove the same either before the first crystallisation step or before the second crystallisation by increasing the pH resulting in the precipitation of calcium fluoride which subsequently is separated.

DETAILED DESCRIPTION OF THE INVENTION

The present invention provides a multi-stage process as defined above. In the following this combined ion exchange and crystallisation process adapted for producing pure potassium nitrate and potassium phosphate will be described in more detail. The ion exchange can be carried out in one multiple column system such as a commercially available simulated moving bed.

Figure 1:
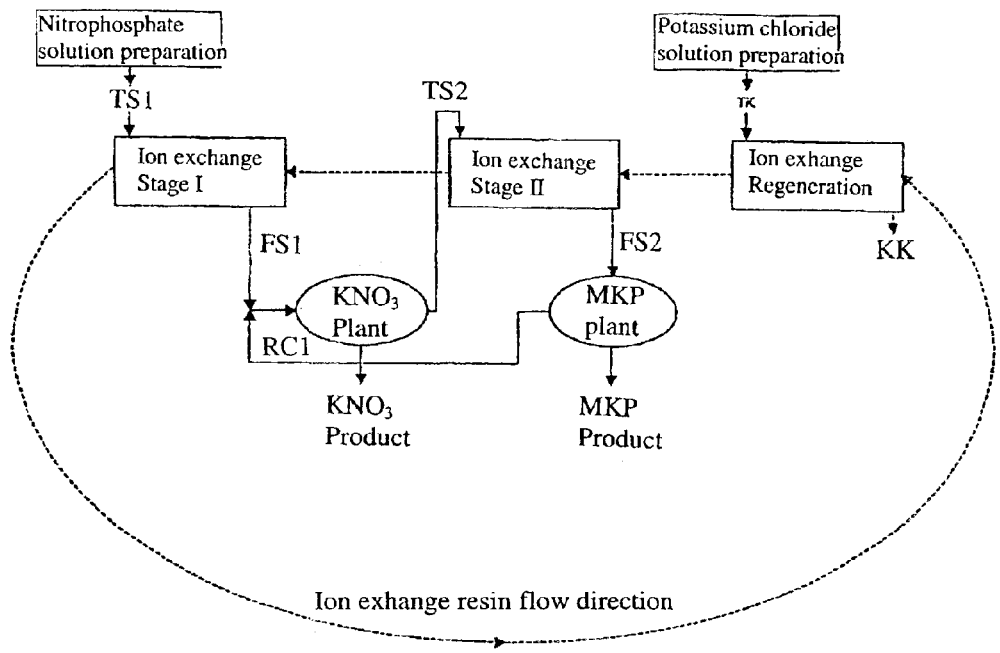
FIG. 1 is a schematic diagram illustrating the process of the present invention.

Referring to FIG. 1 the unit operations of present multistage process are:

Preparation of nitrophosphate solution and if needed, separation of solids,

Ion exchange Stage I,

Potassium nitrate crystallisation,

Ion exchange Stage II,

Monopotassium phosphate crystallisation, and

Ion exchange regeneration.

Preparation of Nitrophosphate Solution

Phosphate rock or an other suitable phosphate raw material is reacted with nitric acid in a conventional rock digestion process to obtain a nitrophosphate slurry. Part of the phosphate rock can be substituted by a phosphate salt or by phosphoric acid, substituting also a part of the nitric acid. By varying the relative amounts of the raw materials the ratio of the two products can be adjusted within quite a broad range. If a slurry is obtained, water is added to it in a countercurrent settler system, and the solid fraction is separated.

Ion exchange stage I. The calcium rich nitrophosphate solution TS1 is fed to a system of columns filled with an ion exchange resin, in this case a strong cationic macroporous resin with a high oxidising stability. The ion exchange columns are operated in a countercurrent way, which can be described as a simulated moving bed unit. The calcium in the nitrophosphate solution is exchanged with potassium from the potassium loaded resin. The potassium enriched effluent FS1 can be regarded as a mixture of calcium nitrate and potassium nitrate in phosphoric acid.

Potassium nitrate crystallisation. Potassium nitrate is precipitated after concentration of the effluent from the first ion exchange step. Crystallisation can be performed by any conventional crystallisation technique. The crystallisation of potassium nitrate can be done at temperatures from 80 to −30° C. and preferably from −10 to 10° C.

Ion exchange stage II. The mother liquor TS2 from potassium nitrate crystallisation has now become richer in calcium due to removal of potassium in the potassium nitrate crystalliser. With respect to anions the mother liquor has become richer in phosphate compared to nitrate which was removed during the potassium nitrate crystallisation. This mother liquor TS2 is recycled back to the system of ion exchange columns to the second step just where the effluent from ion exchange I was taken out. Introduction of this second ion exchange step permits improving the efficiency of calcium removal as well as the subsequent crystallisation of potassium phosphate.

Ion exchange regeneration. The calcium, hydronium, and magnesium ions on the resin are exchanged with potassium by adding a solution of potassium chloride, TK. The effluent is an acidic solution of calcium chloride, KK.

Monopotassium phosphate crystallisation. The effluent FS2 with lowered calcium content from the second ion exchange step is concentrated, and e.g. potassium hydroxide is added to adjust the pH value to between 3 and 6. Increasing the pH will precipitate calcium and magnesium phosphates, which are separated from the fluid and either discharged or recycled as a phosphate source to the digestion reactor.

The liquid phase can be regarded as a mixture of potassium phosphate and potassium nitrate. By controlling the crystallisation temperature, water content and the ratio between nitrate and phosphate ions in the crystallisation solution a pure monopotassium phosphate product can be produced. Monopotassium phosphate can be crystallised at temperatures between 0 and 100° C., preferably between 30 and 80° C., at a pH range of 4 to 5. The mother liquor RC1, which now consists mainly of potassium nitrate, is recycled back to potassium nitrate crystallisation.

Fluoride removal. Fluorides originating from phosphate rock can easily be removed before either crystallisation step by increasing the pH and by subsequent separation of the precipitated calcium fluoride.

The output streams of the above outlined process are solid potassium nitrate and solid monopotassium phosphate, and a calcium chloride solution, which can be upgraded to a saleable product. Raw materials, which can be used in the process, include rock phosphate or other suitable phosphate sources, potassium chloride, potassium hydroxide or an other alkaline substance, and optionally an alkaline calcium compound such as calcium oxide for neutralisation and precipitation.

An advantage of the process according to the invention is that pure products can be produced from cheap basic raw materials. Two valuable products are produced in the same process. The process design offers a flexible choice of the salts produced as well as the relative amounts thereof. The present process gives a high efficiency and a high resin utilisation at the ion exchange unit and taken as a whole the utilisation of raw materials is maximised while the amount of waste generated is kept at a minimum. No gypsum or corrosive gaseous substances are formed, and no organic solvents are needed. Compared to conventional ion exchange processes the present invention is more energy efficient than manufacturing the two products in separate processes, where the total degree of dilution is higher.

EXAMPLES

Example 1

Figure 2:
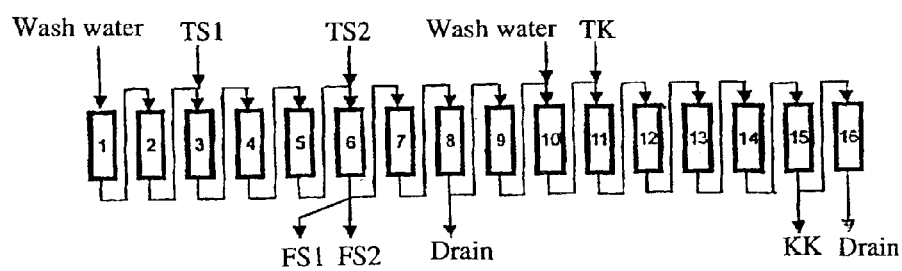
FIG. 2 is a schematic representation of the ion exchange operation.

The ion exchange process was operated according to the configuration, presented in FIG. 2, consisting of 16 columns. A nitrophosphate slurry was prepared by mixing phosphate rock with nitric acid. After the separation of solids by settling a solution here designated by TS1 was obtained. The other feed solution, TS2, was obtained from crystallisation of potassium nitrate after the first ion exchange step. The resin was regenerated with a potassium chloride solution, TK. The compositions of TS1, TS2 and TK are presented in Table 1. The feeds were arranged in a sequential fashion: TS2 followed by TS1 and washing in the production stage; TK followed by washing in the regeneration stage. The temperature was kept between 30 and 60° C. throughout the multi-stage ion exchange process.

TABLE 1

Compositions of ion exchange feed solutions TS1, TS2 and TK

| Component | TS1 % w/w | TS2 % w/w | TK % w/w |
|---|---|---|---|
| Ca | 9.05 | 4.20 | — |
| K | 0.24 | 4.65 | 13.3 |
| $NO_3$—N | 6.97 | 3.84 | — |
| $PO_4$—P | 4.11 | 8.57 | — |

After a steady state was reached samples were taken from the product streams FS1, FS2 and KK. The compositions of FS1, FS2 and KK are presented in Table 2.

The product streams are named after the feed streams, which means that TS1 becomes FS1, TS2 becomes FS2 and TK becomes. KK, after passing the ion exchange column.

TABLE 2

Compositions of ion exchange outlet solutions FS1, FS2 and KK

| Component | FS1 % w/w | FS2 % w/w | KK % w/w |
|---|---|---|---|
| Ca | 2.22 | 0.46 | 3.28 |
| K | 8.73 | 5.97 | 0.85 |
| $NO_3$—N | 4.64 | 1.45 | — |
| $PO_4$—P | 3.70 | 3.83 | — |

It was possible to operate the two-step ion exchange with a resin utilisation significantly above 60%. In the first and second exchange step respectively 60 and 50% of the calcium in feed streams TS1 and TS2 were removed, taking into account the dilution of the feed streams.

Example 2

In a second ion exchange experiment the number of columns was increased to 18 by adding two more columns in the production stage, one in each step, to investigate the possibilities of further improvement of the removal of calcium, i.e. the efficiency of the ion exchange process. The process conditions were similar to those described in Example 1. The compositions of the inlet and outlet streams are presented in Tables 3 and 4.

TABLE 3

Compositions of ion exchange feed solutions TS1, TS2 and TK

| Component | TS1 % w/w | TS2 % w/w TK | TK % w/w |
|---|---|---|---|
| Ca | 9.4 | 3.3 | — |
| K | 0.2 | 3.9 | 13.3 |
| $NO_3$—N | 6.2 | 1.8 | — |
| $PO_4$—P | 3.9 | 6.1 | — |

TABLE 4

Compositions of ion exchange outlet solutions FS1, FS2 and KK

| Component | FS1 % w/w | FS2 % w/w | KK % w/w |
|---|---|---|---|
| Ca | 2.0 | 0.5 | 3.6 |
| K | 7.8 | 6.3 | 1.0 |
| $NO_3$—N | 3.8 | 0.8 | — |
| $PO_4$—P | 3.1 | 3.9 | — |

By increasing the number of columns from 16 to 18 it was possible to improve the removal of calcium ions in the two-stage ion exchange process: 64 and 71% of the calcium were removed in the two steps respectively.

Example 3

In another experiment the ion exchange was operated as in Example 1. The outlet solution FS1 was concentrated by evaporation to give a water content of 60% in the mother liquor, TS2, after crystallisation of potassium nitrate. After separation of insolubles, potassium nitrate was crystallised at 5° C. The crystals were separated from the mother liquor by filtration, washed with water and dried. The mother liquor was reintroduced to the ion exchange system as TS2. The compositions of the inlet and outlet streams as well as that of the potassium nitrate crystals obtained are presented in Table 5.

TABLE 5

Compositions of potassium nitrate crystals and of crystallisation inlet solutions FS1 and RC1 and outlet solution TS2 [% w/w]

| Stream | Ca | K | $NO_3$—N | $PO_4$—P | Cl | F | Mg | Fe | $H_2O$ |
|---|---|---|---|---|---|---|---|---|---|
| FS1 | 1.7 | 8.0 | 3.7 | 3.1 | 0.45 | 0.03 | 0.10 | n.m. | n.m |
| RC1 | 0.08 | 17.9 | 4.0 | 1.8 | 4.1 | n.m. | n.m. | n.m. | n.m. |
| TS2 | 3.3 | 4.8 | 2.1 | 6.5 | 3.1 | 0.01 | 0.18 | 0.053 | 58.3 |
| $KNO_3$ | 0.015 | 38.7 | 13.8 | <0.05 | 0.02 | 0.05 | <0.005 | <0.002 | 0.13 |

As can be seen from the results in Table 5 a pure potassium nitrate product could be obtained.

Example 4

In another experiment the ion exchange was operated as in Example 1. The outlet solution FS2 was neutralised with potassium hydroxide to a pH value of 4.2 to precipitate impurities containing calcium and magnesium. The precipitates were separated by filtration, and monopotassium phosphate was crystallised from the solution CFS at 50° C. by vacuum crystallisation. The crystals were separated from the mother liquor by filtration, washed with water and dried. The crystallisation mother liquor RC1 was mixed with FS1 and concentrated as described in the potassium nitrate crystallisation process.

The compositions of the inlet and outlet streams as well as that of the potassium phosphate crystals obtained are presented in Table 6.

TABLE 6

Compositions of potassium phosphate crystals and of crystallisation inlet and outlet solutions CFS and RC1

| Component | CFS % w/w | RC1 % w/w | $KH_2PO_4$ % w/w |
|---|---|---|---|
| Ca | 0.04 | 0.1 | — |
| K | 10.1 | 16 | 28.9 |
| $NO_3$—N | 1.1 | 2.8 | 0.03 |
| $PO_4$—P | 3.8 | 1.6 | 22.7 |
| Cl | 2.4 | 6.12 | 0.09 |

As can be seen from the results in Table 6 a pure potassium phosphate product with very low amounts of residual calcium, nitrogen or chlorine could be obtained.

In the above examples chloride was added to simulate the accumulation of possible impurities where chloride will be the most probably impurity because it can not be removed by precipitation. As can be seen from the composition of the two products, the chloride has not given rise to any problems.

What is claimed is:

1. A process for producing an alkali metal nitrate and an alkali metal phosphate in the same process from a phosphate raw material and a nitrate raw material comprising the steps of:
    a) reacting the phosphate raw material with the nitrate raw material to provide an aqueous nitrophosphate feed, optionally followed by the separation of solid material,
    b) introducing the aqueous nitrophosphate feed into a first ion exchange step comprising an alkali metal-loaded cationic exchange resin for exchanging cations present in the feed with alkali metal ions present on the resin to obtain a stream enriched in alkali metal ions,
    c) subjecting the stream from step (b) to a first crystallisation under such conditions that an alkali metal nitrate is crystallised and separating the crystallised alkali metal nitrate from the mother liquor,
    d) introducing the mother liquor from step (c) into a second ion exchange step comprising an alkali metal-loaded cationic exchange resin for exchanging cations present in the mother liquor with alkali metal ions present on the resin to obtain a phosphate containing stream enriched in alkali metal ions, and
    e) subjecting the stream from step (d) to a second crystallisation under such conditions that an alkali metal phoshate is crystallised and separating the crystallised alkali metal phosphate from the mother liquor.

2. The process of claim 1 further comprising the step of:
    f) introducing the mother liquor from step (e) into the first crystallisation step (c).

3. The process of claim 1 or 2 wherein the cationic exchange resins of both the first ion exchange step and the second ion exchange step are part of the same ion exchange system.

4. The process of claim 3 wherein the ion exchange system comprises a multiple column system operating as a continuous simulated moving bed.

5. The process of claim 1 wherein the ion exchange resins are regenerated with a solution of an alkali metal salt.

6. The process of claim 1 wherein the alkali metal is potassium.

7. The process of claim 1 wherein the crystallised alkali metal nitrate comprises potassium nitrate, and the crystallised alkali metal phosphate comprises monopotassium phosphate.

8. The process of claim 1 wherein said cations to be exchanged and present in the feeds introduced into the first and second ion exchange steps comprise calcium, hydronium ions and optionally magnesium ions.

9. The process of claim 1 wherein the phosphate raw material comprises phosphate rock, mono- or dicalcium phosphate and/or phosphoric acid.

10. The process of claim 1 wherein the nitrate raw material comprises nitric acid and/or calcium nitrate.

11. The process of claim 1 wherein the first crystallisation is effected by decreasing the temperature and by concentration.

12. The process of claim 1 wherein the pH of the stream from step (d) is increased to a value between 3 and 6 to precipitate impurities which are separated.

13. The process of claim 12 wherein the precipitated and separated impurities comprise calcium and magnesium phosphates which are recycled to step (a) as part of the phosphate raw material.

14. The process of claim 1 wherein the second crystallisation is effected by adjusting the pH to a value between 4 and 5 and by concentration.

15. The process of claim 12 or 14 wherein potassium hydroxide or an other alkaline material is added to increase the pH to the desired value.

* * * * *